United States Patent
Stone et al.

(10) Patent No.: US 10,341,020 B2
(45) Date of Patent: Jul. 2, 2019

(54) FLEXIBLE ETHERNET LOGICAL LANE AGGREGATION

(71) Applicant: Avago Technologies International Sales Pte. Limited, Singapore (SG)

(72) Inventors: Rob Stone, Berkeley, CA (US); Eric Baden, Saratoga, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/459,647

(22) Filed: Mar. 15, 2017

(65) Prior Publication Data
US 2017/0272308 A1 Sep. 21, 2017

Related U.S. Application Data

(60) Provisional application No. 62/309,871, filed on Mar. 17, 2016.

(51) Int. Cl.
| | | |
|---|---|---|
| H04L 1/00 | (2006.01) | |
| H04B 10/25 | (2013.01) | |
| H04L 12/801 | (2013.01) | |

(52) U.S. Cl.
CPC ............. *H04B 10/25* (2013.01); *H04L 47/10* (2013.01)

(58) Field of Classification Search
CPC ............................. H04L 41/0668; H04B 10/25
See application file for complete search history.

(56) References Cited

U.S. PATENT DOCUMENTS

| | | | | |
|---|---|---|---|---|
| 8,549,378 | B2* | 10/2013 | Alves | G06F 11/1044 711/114 |
| 9,413,454 | B1* | 8/2016 | Reddy Bovilla | H04B 10/03 |
| 2006/0215570 | A1* | 9/2006 | Zhang | H04L 12/5692 370/242 |
| 2007/0033435 | A1* | 2/2007 | Stange | G05B 9/03 714/15 |
| 2007/0244937 | A1* | 10/2007 | Flynn, Jr. | G06F 11/1662 |
| 2010/0162033 | A1* | 6/2010 | Ahn | G06F 11/2007 714/4.1 |
| 2011/0320857 | A1* | 12/2011 | Kwon | H04L 41/0672 714/2 |
| 2012/0320914 | A1* | 12/2012 | Thyni | H04L 45/745 370/389 |
| 2013/0003549 | A1* | 1/2013 | Matthews | H04L 41/0668 370/235 |
| 2013/0201822 | A1* | 8/2013 | Liang | H04L 45/245 370/228 |
| 2014/0078894 | A1* | 3/2014 | Han | H04L 41/0677 370/228 |
| 2014/0341012 | A1* | 11/2014 | Holness | H04L 41/0659 370/225 |
| 2015/0156127 | A1* | 6/2015 | Bello | H04L 47/125 370/235 |

(Continued)

*Primary Examiner* — Clemence S Han
(74) *Attorney, Agent, or Firm* — Foley & Lardner LLP

(57) ABSTRACT

A system or method for logical lane aggregation provides data across a first set of interconnect lanes and determines that at least one interconnect lane is unavailable. The system or method redistributes data to a second set of interconnect lanes, the second set not including the at least one interconnect lane, in response to the at least one interconnect lane being unavailable. The system or method can be used to provide flexible Ethernet logical lane aggregation (FELLA).

20 Claims, 5 Drawing Sheets

(56) References Cited

U.S. PATENT DOCUMENTS

2015/0319646 A1* 11/2015 Zhou ................... H04L 49/70
                                                            370/237
2016/0241465 A1* 8/2016 Hasegawa ........... H04L 41/0631
2017/0118124 A1* 4/2017 Raman ................. H04L 47/125

* cited by examiner

FLEXIBLE ETHERNET LOGICAL LANE AGGREGATION

CROSS-REFERENCE TO RELATED APPLICATIONS

This application claims priority to and the benefit of U.S. Provisional Application No. 62/309,871, entitled "Flexible Ethernet Logical Lane Aggregation," filed Mar. 17, 2016, which is incorporated herein by reference in its entirety for all purposes.

FIELD OF THE DISCLOSURE

This disclosure generally relates to systems and methods for lane aggregation in networks including but not limited to systems and methods for flexible Ethernet logical lane aggregation (FELLA).

BACKGROUND OF THE DISCLOSURE

Interconnect links, such as high speed Ethernet datacenter interconnect links, generally distribute data across multiple lanes to form a higher bandwidth link. This approach is referred to as multiple lane distribution (MLD). In order for the interconnect link to operate, all the interconnect lanes must generally be operational at all times, and failure of one or more individual lanes results in complete link failure. For example, a single failed laser, which is a component that is susceptible to failure, can result in a complete MLD link failure.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
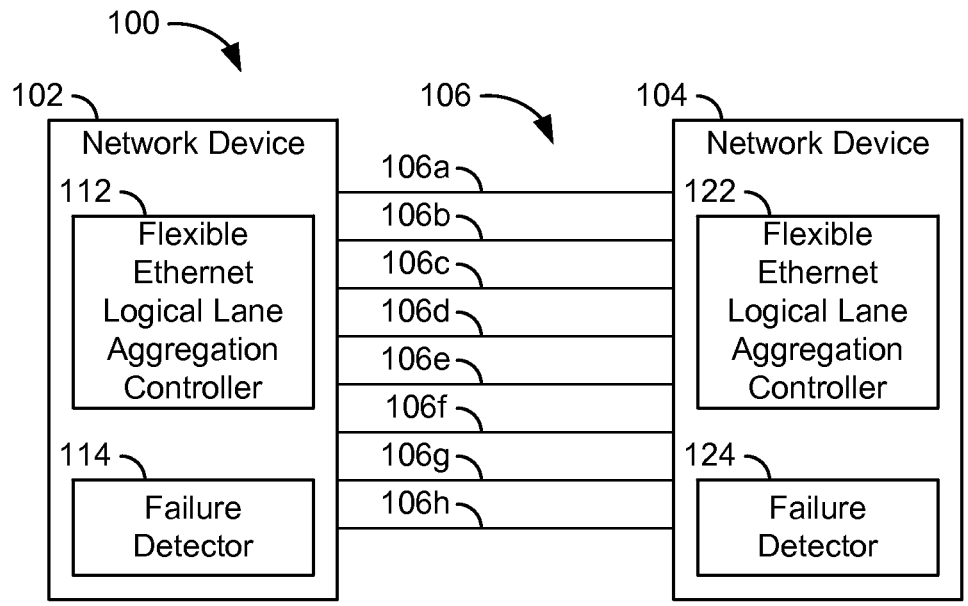
FIG. 1 is a block diagram of a network including network devices using flexible logical lane aggregation in accordance with some embodiments.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for flexible logical lane aggregation; and Section B describes a network environment and computing environment which may be useful for practicing embodiments described herein.

A. Flexible Logical Lane Aggregation

According to some embodiments, systems and methods use an Ethernet standard implementation of a multiple lane distribution (MLD) that is modified so that any number of MLD lanes can be selectively removed from service or added to service. In some embodiments, the systems and methods advantageously re-distribute the data over the remaining operational lanes without fundamentally altering the media access controller or requiring service of the link (such as replacing the optical module). In some embodiments, the systems and methods implement flexible Ethernet logical lane aggregation (FELLA). In some embodiments, FELLA provides a mechanism to operate Ethernet MLD lanes with a number of the lanes removed from service due to hardware faults or removed from service electively to save power. In some embodiments, FELLA allows any number of lanes in a port to be brought down and enables the remaining lanes to continue the transfer of data.

In some embodiments, FELLA advantageously enables a programmable power reduction when the interconnect link is not required to operate at full bandwidth, by reducing the number of operating lanes commensurate with the bandwidth needs. (For either optical or electrical interconnects, the interconnect power is proportional to the number of physical lanes being used.) In some embodiments, FELLA advantageously provides benefits for network fault tolerance by having the ability to take a lane out of service and have the interconnect link continue to function at a reduced bandwidth.

In some embodiments, using FELLA to take a failed lane out of service and to re-distribute the data across the remaining functional lanes improves the system reliability and resilience. Improved system reliability and resilience is advantageous when optics associated with the physical lanes are not field serviceable, such as mid-board or integrated optics situations where an entire system line-card may be required to be removed from service in order to replace a single failed laser (out of many hundreds present on the line-card) in some embodiments. By using FELLA, a hard failure of a physical lane results in a reduction in link bandwidth for that particular MLD but the system reliability and operational cost of using mid-board optics are dramatically improved according to some embodiments.

In some embodiments, a system or method provides logical lane aggregation. The system or method provides data across a first set of interconnect lanes and determines that at least one interconnect lane is unavailable. The system or method redistributes data to a subset of the interconnect lanes in response to the at least one interconnect lane being unavailable. The subset does not include the at least one interconnect lane. The system or method can be used to provide flexible Ethernet logical lane aggregation.

In some embodiments, a network device includes a fault detector and a flexible Ethernet logical lane aggregation control circuit configured to redistribute data to a first set of interconnect lanes in response to a fault signal from the fault detector indicating at least one interconnect lane is unavailable. The first set does not include the at least one interconnect lane.

In some embodiments, a network device includes a media access sublayer and a physical coding sublayer. The physical coding sublayer is configured to provide data on the first set of interconnect lanes and is configured to redistribute data to a subset of interconnect lanes in response to at least one interconnect lane being unavailable. The subset does not include the at least one interconnect lane.

FIG. 1 is a block diagram of an implementation of a network 100 including a network device 102 and a network device 104. In some embodiments, network 100 is an electronic, optical or other network. Network 100 can be an electrically wired or optical network interface operating according to an Ethernet standards (including 100GBASE-R, or 400GBASE-R) in some embodiments. Data can be communicated at various rates and formats on network 100 including a 100 Gigabits per second (Gb/s) or 400 Gb/s rate communicating packets or frames. In some embodiments, networks devices 102 and 104 communicate across a 400 Gb/s interconnect link with 8×50 Gb/s lanes or a 100 Gb/s interconnect link with four 25 Gb/s lanes.

Network devices 102 and 104 communicate via an interconnect link or lane 106 including interconnect lanes 106a-h. Network devices 102 and 104 may operate in conjunction with system software (e.g., a network driver, OS kernel, etc.) running on a processor, to send or receive packets (e.g., Ethernet packets), as discussed in more detail below in connection with FIGS. 4A-C. In some embodiments, network devices 102 and 104 are Ethernet devices configured to provide FELLA (e.g., Dune switch products, XGS switch products, network controllers, retimer physical layer devices or other switch products configured to provide FELLA). Network devices 102 and 104 accommodate changes in link availability without requiring full re-initialization in some embodiments. In some embodiments, network devices 102 and 104 are any communication devices for implementing logical line aggregation including but not limited to any type of Ethernet devices or switch. Network devices 102 and 104 can be integrated with other communication, sensing or computing components in some embodiments.

Although eight interconnect lanes 106a-h are shown in FIG. 1 as interconnect link or lane 106, any number of physical lanes can be utilized including but not limited to 2, 4, 8, 16, or 32 in some embodiments. In some embodiments, interconnect lanes 106a-h are optical lanes (e.g., fiber optic cables, or different wavelengths). In some embodiments, interconnect lanes 106a-h are electric conductors. Interconnect lanes 16a-h are bidirectional or include a separate transmit line and receive line in some embodiments. In some embodiments, interconnect lanes 106a-h provide eight physical lanes, each driven by an individual physical transmitter, such as a laser. In some embodiments, interconnect link or lane 106 includes sixteen physical lanes with each physical lane driven by an individual, independent laser.

Network device 102 includes a FELLA control circuit or a FELLA controller 112 and a failure detection circuit or failure detector 114. FELLA controller 112 and failure detector 114 can each be hardware circuit, a software module, or combination thereof. FELLA controller 112 and failure detector 114 are part of an Ethernet sublayer including but not limited to the physical sublayer. In some embodiments, FELLA controller 112 and failure detector 114 are implemented in a physical coding sublayer (PCS), a physical medium attachment (PMA) sublayer, or a combination thereof.

FELLA controller 112 implements FELLA for network device 102. FELLA controller 112 determines if one or more of interconnect lanes 106a-h should be removed from service due to: (1) a malfunction determined by failure detector 114 or determined from a communication from network device 104 or other device, or (2) a power reduction message. The power reduction message can be provided by network device 102, network device 104 or other device when power savings is desirable. Power saving may be desirable based upon lower communication loads (e.g., one or more interconnect lanes 106a-h are not required to operate at full bandwidth), overheating, or reductions or limits to available power in some embodiments. In response to one or more of interconnect lanes 106a-h being removed from service, FELLA controller 112 redistributes data carried over the removed lane to operational interconnect lanes of interconnect lanes 106a-h. FELLA controller 112 determines if one or more of interconnect lanes 106a-h should be added to service due to: (1) a malfunction remedy determined by failure detector 114 or determined from a communication from network device 104 or other device, or (2) a bandwidth increase message. In response to one or more of interconnect lanes 106a-h being added to service, FELLA controller 112 redistributes data carried over the existing lanes to operational interconnect lanes including the added lane(s) of interconnect lanes 106a-h.

Failure detector 114 senses a failure or failure remedy in one or more of interconnect lanes 106a-h at a transmit end, a receive end, or both the transmit end and the receive end of the interconnect lanes 106a-h. Failure detector 114 uses optical link diagnostics to determine the existence of a link failure or link remedy in some embodiments. Ethernet link fault diagnostics can be utilized in some embodiments and include but are not limited to bidirectional forwarding detection (BFD), link test signal results, unidirectional link fault detection, energy detection, error correction analysis, and reconciliation sublayer (RS) monitoring. Failure detector 114 can receive a signal from network device 104 indicating a failure in one or more of interconnect lanes 106a-h at a transmit or receive end of network devices 102 and 104. Failure detector 114 provides data to FELLA controller 112 indicating the existence of the fault and the identification of the interconnect lane or interconnect lanes 106a-h that are non-operational or that should be added.

Network device 104 includes a FELLA controller 122 and a failure detector 124. FELLA controller 122 and a failure detector 124 operate similar to FELLA controller 112 and failure detector 114 and can each be hardware circuit, a software module, or combination thereof. FELLA controller 122 and failure detector 124 are part of an Ethernet sublayer including but not limited to the physical sublayer. In some embodiments, FELLA controller 122 and failure detector 124 are implemented in a physical coding sublayer (PCS), a physical medium attachment (PMA) sublayer, or a combination thereof in some embodiments. In some embodiments, FELLA control controllers 112 and 122 provide signals or messages to each other to identify changes to the number of interconnect lanes 106a-h (e.g., the identification of remaining interconnect lanes 106a-h) so that accommodations can be made at the transmit end and the receive end of both network devices 102 and 104.

Figure 2:
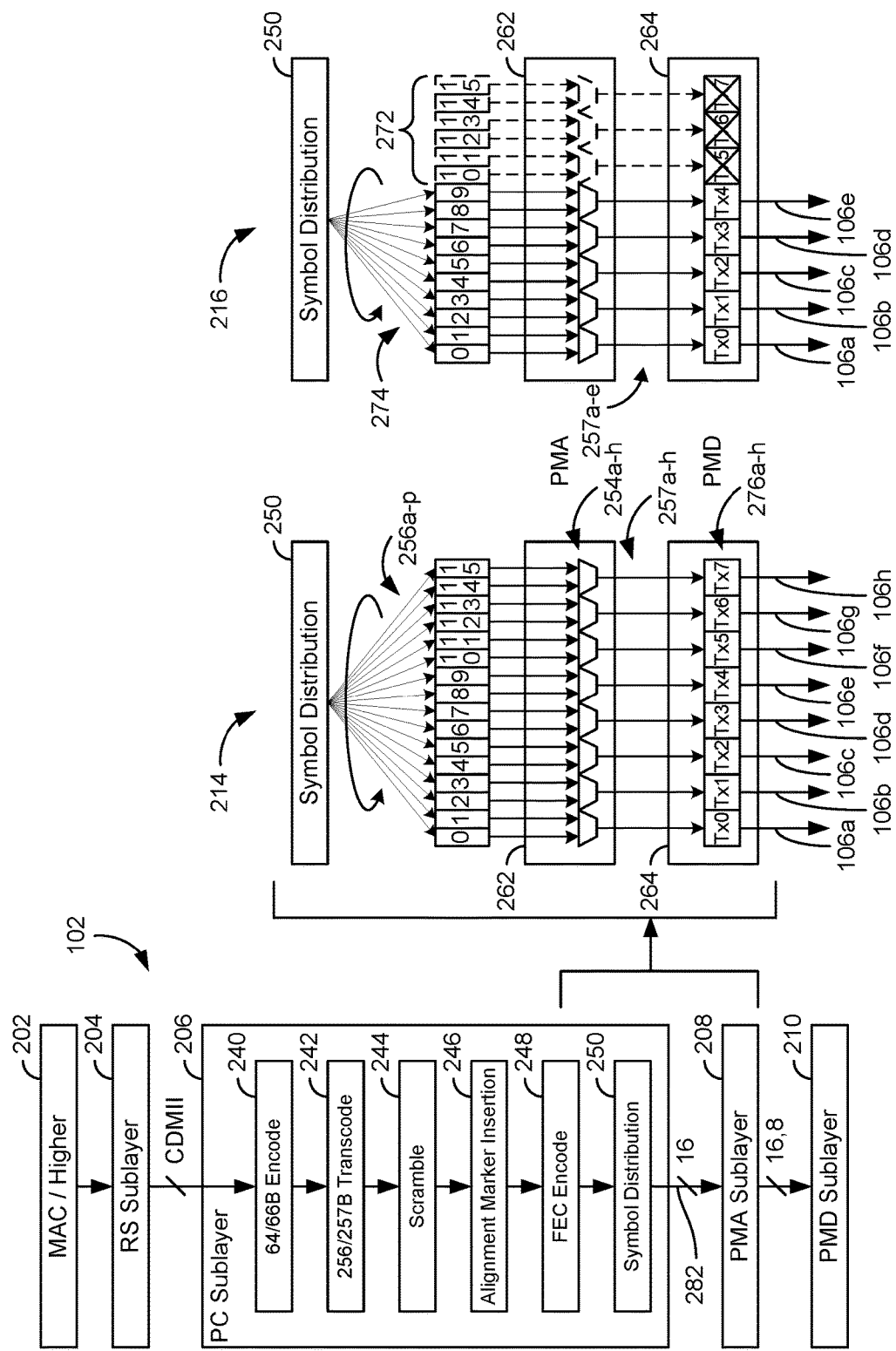
FIG. 2 is a more detailed block diagram of one of the network devices illustrated in FIG. 1 using flexible logical lane aggregation in accordance with some embodiments.

With reference to FIG. 2, a transmit side of network device 102 is shown and includes a higher layer, such as a media access control (MAC) sublayer 202, a reconciliation sublayer 204, a physical coding sublayer (PCS) 206, a physical medium attachment (PMA) sublayer 208, and a physical medium dependent (PMD) sublayer 210. The transmit side is configured for 400 Gb/s transmit operations according to some embodiments. Receive operations are similar and correspond to the transmit side operations discussed herein in accordance with some embodiments.

Network device 102 communicates or distributes symbols via interconnect lanes 106a-h. During normal operation, all eight interconnect lanes 106a-h are utilized as shown in a communication 214 while less than all eight interconnect lanes distribute symbols when in a power saving mode or in response to a fault as shown in a communication 216.

MAC sublayer 202 is part of a data link layer (layer 2) of an eight-layer open system interconnection (OSI) model in some embodiments. MAC sublayer 202 provides addressing and channel access control mechanisms that make it possible for several terminals or network nodes to communicate within a multiple access network that incorporates a shared medium, e.g., an Ethernet network, in some embodiments. The hardware that implements the MAC sublayer 202 is a media access controller in some embodiments.

Reconciliation sublayer 204 allows communication between MAC sublayer 202 and physical coding sublayer 206 and handles some error processing in some embodiments. In some embodiments, reconciliation sublayer 204 processes physical layer local/remote fault messages. Reconciliation sublayer 204 is disposed between MAC sublayer 202 and physical coding sublayer 206. In some embodiments, reconciliation sublayer 204 and physical coding sublayer 206 have a media independent interface (e.g., MII, RMII, SMII, GMII, RGMII, SGMII, XGMII, XLGMII, CGMII, CDMI, or other interface).

Physical coding sublayer 206 is a networking protocol sublayer and resides at the top of the physical layer (PHY). Physical coding sublayer 206 provides an interface between physical medium attachment sublayer 208 and reconciliation sublayer 204. Physical coding sublayer 206 takes data from MAC sublayer 202 and encodes it such that it can be communicated on interconnect lanes 106a-h serially without error in some embodiments. Physical coding sublayer 206 provides encoding/decoding, scrambling/descrambling, alignment marker insertion/removal, block and symbol redistribution, lane block synchronization and de-skew in some embodiments.

Physical medium attachment sublayer 208 performs PMA framing, octet synchronization/detection, scrambling/descrambling, and other functions. Physical medium attachment sublayer 208 provides multiplexing and demultiplexing operations in some embodiments. Physical medium attachment sublayer 208 enables changing of lane number and rate per lane for multiple physical layer specifications and performs FELLA in coordination with physical coding sublayer 206 in some embodiments. A sixteen bit interface is provided between physical coding sublayer 206 and physical medium attachment sublayer 208 in some embodiments.

Physical medium dependent sublayer 210 defines the physical layer of computer network protocols. Physical medium dependent sublayer 210 defines the details of transmission and reception of individual bits on a physical medium (e.g., interconnect lanes 106a-h) including but not limited to bit timing, signal encoding, interacting with the physical medium, and the properties of the cable, optical fiber, or wire itself in some embodiments. Physical medium dependent sublayer 210 includes a set of transmitters 276a-h corresponding to interconnect lanes 106a-h. Transmitters 276a-h are individual lasers (Tx0-Tx7) in some embodiments. In some embodiments, transmitters 276a-h are electromagnetic transmitters. A sixteen/eight bit interface is provided between physical medium attachment sublayer 208 and physical medium dependent sublayer 210 in some embodiments.

Physical coding sublayer 206 includes a byte encode unit 240, a byte transcode unit 242, a scramble unit 244, an alignment marker insertion unit 246, a forward error correction (FEC) encode unit 248, and a symbol distribution unit 250. Byte encode unit 240 changes the format so that the data can be communicated more cleanly across interconnect lanes 106a-h. In some embodiments, byte encode unit 240 encodes 64 bits from MAC sublayer 202 to 66 bytes. Byte transcode unit 242 compresses the data to provide room for error correction data. In some embodiments, byte transcode unit 242 transforms four sets of 64 bits from MAC sublayer 202 to 257 bits and provides the 257 bits to scramble unit 244.

Scramble unit 244 ensures that there is enough frequency information on interconnect lanes 106a-h for proper reception of data. Alignment marker insertion unit 246 provides bits for each of interconnect lanes 106a-h so that latency on different interconnect lanes 106 a-h can be accommodated. The bits from alignment marker insertion unit 246 are used to allow the receiver to de-skew data in some embodiments. FEC encode unit 248 provides error correction bits (e.g., parity bits) for the data.

Symbol distribution unit 250 manages the provision of data on each of interconnect lanes 106a-h. Generally, symbol distribution unit 250 provides the data as symbols in a round-robin fashion on interconnect lanes 106a-h. In some embodiments, data from FEC encode unit 248 are distributed on symbol basis (e.g., 10 bits per symbol) or a block basis (66 bits per symbol). Different mechanisms having different modes or different distribution operations can be used to place symbols on the interconnect lanes 106a-h.

Physical medium attachment sublayer 208 includes a set of multiplexers 254a-h. Multiplexers 254a-h each includes a number (e.g., 2) of inputs coupled to a memory or set of symbol registers 256a-p associated with symbol distribution unit 250. The number of symbol registers 256a-p corresponds to the number of inputs of multiplexers 254a-h (e.g., two times the number of multiplexers 254a-h) in some embodiments. The numbers discussed above and the arrangement of multiplexers 254a-h of multiplexer 262 and symbol registers 256a-p are exemplary only and not discussed in a limiting fashion. Symbol registers 256a-p store symbols for provision through multiplexers 254a-h to interconnect lanes 106a-h via the output of each multiplexer 254a-h and physical medium dependent sublayer 210. The symbols represent data and can be any of a variety of formats suitable for network communications in some embodiments.

Network device 102 operates according to communication 214 where physical coding sublayer 206 using FEC encode unit 248 and symbol distribution unit 250 to distribute FEC symbols across an input 282 of physical medium attachment sublayer 208 in a round robin fashion to 16 PMA lanes. The symbols are bit multiplexed in physical medium attachment sublayer 208 and mapped on a 1:1 basis to transmitters 276a-h of transmitter 264.

When an interconnect lane such as interconnect lanes 106f-h are turned off or unavailable (either electively, or as result of a component failure in the optics), network device 102 operates according to communication 216. As interconnect lanes 106f-h are not operational, FEC symbols from FEC encode unit 248 are distributed across PMA lanes 257a-e (of PMA lanes 257a-h) associated with interconnect lanes 106a-e, with interconnect lanes 106f-h skipped. Thus, the transmitted data is re-distributed across the remaining lanes, and the overall bandwidth of the link is reduced commensurate with the reduction in the number of lanes of operation in some embodiments. As the PMD bandwidth is reduced (in this example from 400 Gb/s to 250 Gb/s), the total throughput of the overall physical coding sublayer 206 is reduced, reducing the total port bandwidth in some embodiments. The bandwidth reduction is accommodated for in the higher layers (e.g., MAC layer 202) to eliminate any potential for buffer overflow and other errors in some embodiments. The bandwidth reduction can be accommodated by changing the clock rate to the media access controller in some embodiments.

FELLA controller 112 (FIG. 1) which is part of physical coding sublayer 206 causes the symbols to renumbered from zero to nine (group 274) as opposed to zero to 15 to accommodate the reduction in interconnect lanes 106a-h. The renumbering can be performed by symbol distribution unit 250. The symbols are renumbered in a round-robin order in some embodiments. FELLA controller 112 also adjusts the alignment marker insertion to accommodate the reduction in interconnect lanes 106a-h. In some embodiments, alignment marker insertion unit 246 adjusts the alignment markers for the new number of interconnect lanes 106a-h so that the appropriate alignment markers are generated for the appropriate symbol on the appropriate lane.

FELLA controller 112 (FIG. 1) which is part of physical coding sublayer 206 communicates the new bandwidth or information associated with the number of unavailable interconnect lanes 106a-h to higher layers (e.g., MAC layer 202) and controls physical medium attachment sublayer 208 to effect the reduction in interconnect lanes 106a-h. FELLA controller 112 (FIG. 1) can disable multiplexers 254f-h and symbol registers 256k-p associated with group 272 in response to removal of interconnect lanes 106f-h.

In some embodiments, FELLA controller 112 responds to a detected link failure signal provided from failure detector 114 (FIG. 1) which can use optical diagnostics or automatic detection of data loss at the receiver side or some other mechanism. If a link is taken out of service, either intentionally or by a lane failure, network device 102 signals to network device 104 which physical lanes remain available for use. Network device 104 reconfigures to take into account the reverse distribution of the data to the logical lanes. In some embodiments, FELLA controllers 112 and 122 include a look-up table or other data structure that stores information on round robin orders for each combination of operational interconnect lanes 106a-h. In some embodiments, FELLA controllers 112 and 122 include a look-up table or other data structure that stores information on marker insertion adjustments for each combination of operational interconnect lanes 106a-h. Network devices 102 and 104 use the look-up table to re-configure symbol distribution and alignment marker insertion in response to the combination of operational interconnect lanes 106a-h in some embodiments.

Failure detector 114 can initiate automatic and/or pre-emptive removal of lanes from service based on status derived from an optical module (e.g. based on warnings/alarms/monitors), automatic detection of data loss, or some other mechanism. Failure detector 114 can also initiate automatic lane power-down or power-up based on a priori knowledge of link utilization (e.g., port needs to send a lot of data at maximum rate, and a request is received from management for full bandwidth). Failure detector 114 can initiate a power saving mode, where bandwidth is reduced by running links in a lower power mode (with less physical lanes active).

Figure 3:
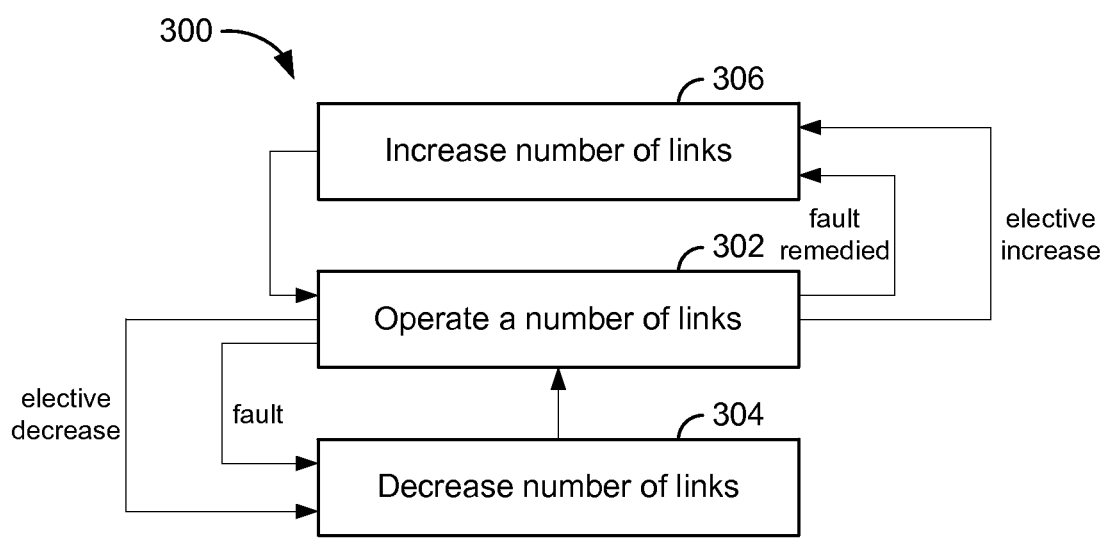
FIG. 3 is a state diagram of one of the network devices illustrated in FIG. 1 using flexible logical lane aggregation in accordance with some embodiments.

With reference to FIG. 3, a state diagram 300 of an implementation of a FELLA procedure performed in network 100 is shown in accordance with an embodiment. In a state 302, network devices 102 and 104 communicate on a number of interconnect lanes 106a-h. Network devices 102 and 104 are placed in a state 304 where the number of interconnect lanes 106 a-h are decreased in response to a fault or an election to reduce the number of interconnect lanes 106 a-h. Once the number of lanes have been reduced and the data is redistributed across the new number of interconnect lanes 106 a-h, network devices 102 and 104 return to state 302 and communicate using the new decreased number of interconnect lanes 106 a-h.

Network devices 102 and 104 are placed in a state 306 where the number of interconnect lanes 106 a-h are increased in response to a fault being remedied or an election to increase the number of links to provide higher bandwidth. Network devices 102 and 104 return to state 302 and communicate using the new increased number of interconnect lanes 106 a-h.

When transferring between states 304 and 306 to state 302, FELLA controller 112 (FIG. 1) can pause MAC sublayer 202 (e.g., stop the media access controller from transmitting) while FELLA controller 112 determines which interconnect lanes 106 a-h are enabled or disabled. FELLA controller 112 reprograms physical coding sublayer 206 and physical medium attachment sublayer 208 for the new number of interconnect lanes 106a-h without requiring the port to be brought down (e.g., without requiring all data to be discarded) in some embodiments.

B. Computing and Network Environment

Figure 4A:
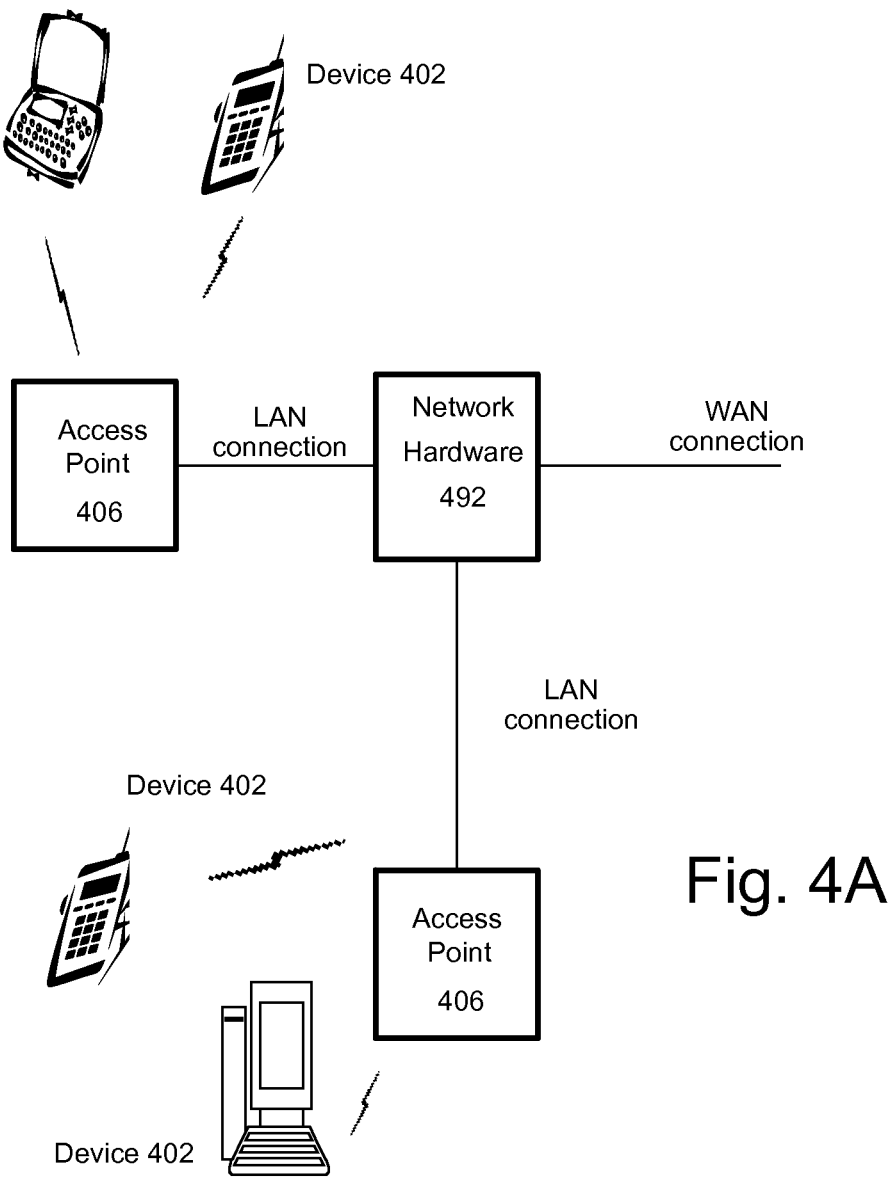
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes wired devices, e.g., a laptop connected via a standard Ethernet cable, and a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment.

The access points (APs) 406 may be operably coupled to the network hardware 492 via local area network connections. The network hardware 492 (e.g., network devices 102 and 104 (FIG. 1)), which may include a router, gateway, switch, bridge, modem, system controller, appliance, etc., may provide a local area network connection for the communication system. Each of the access points 406 may have an associated antenna or an antenna array to communicate with the wireless communication devices 402 in its area via wireless local area network connections. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

An access point 406 may connect to a router (e.g., via a wired network) as a standalone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
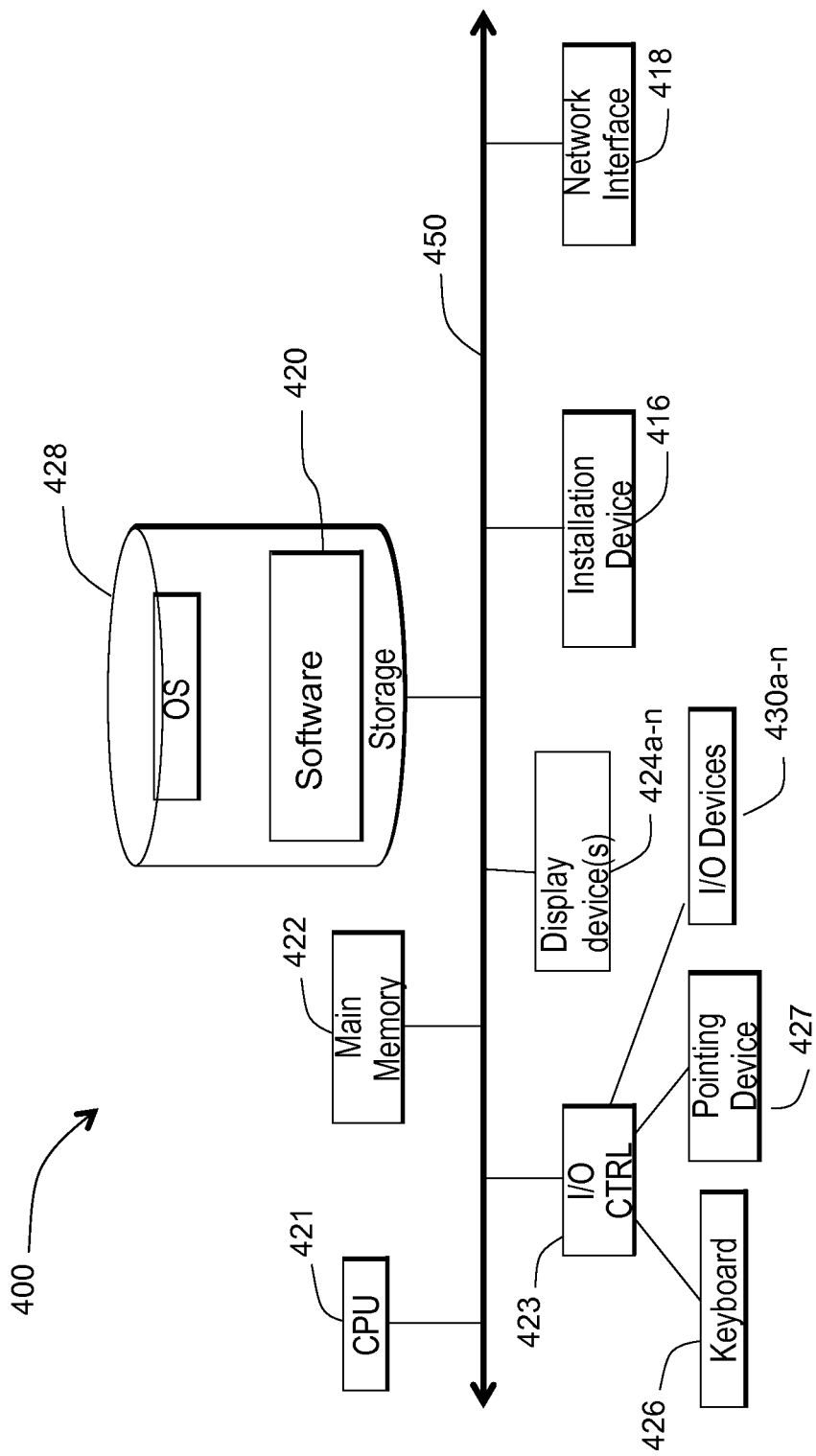
FIGS. 4B and 4C are block diagrams depicting embodiments of computing devices useful in connection with the methods and systems described herein.
Figure 4C:
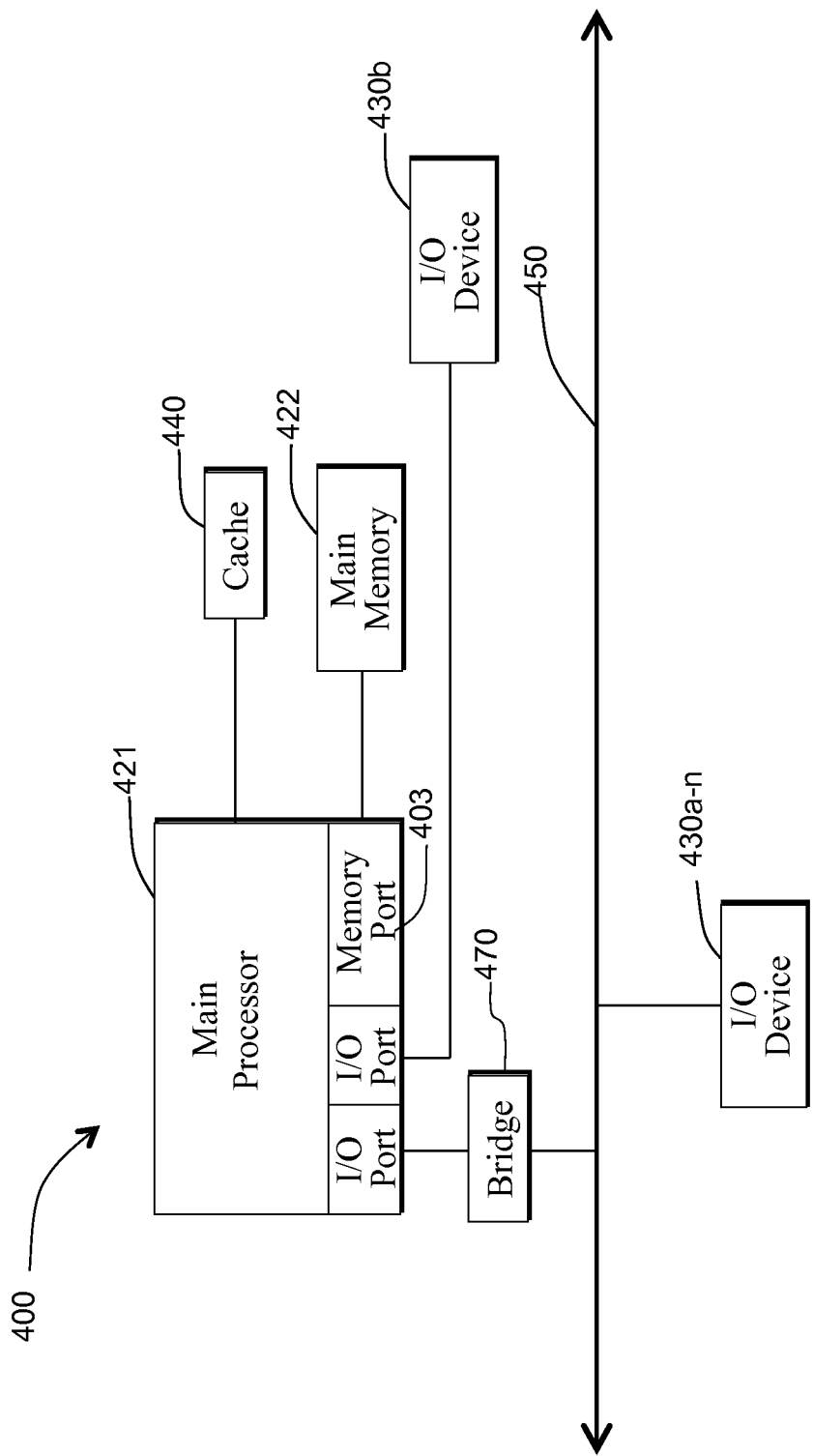

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or application software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium (or an installation device 416) for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 402.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 800' via any type and/or form of gateway or tunneling protocol such as Secure Socket Layer (SSL) or Transport Layer Security (TLS). The network interface 418 may include one of network devices 102 and 104 (FIG. 1) and may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system or computing device 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system or computing device 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for logical lane aggregation, the method comprising:
   providing data across a first set of interconnect lanes;
   in response to receiving a power reduction message to enable power saving, determining that at least one interconnect lane among the first set of interconnect lanes is to be made unavailable; and
   redistributing data to a second set of interconnect lanes, the second set not including the at least one interconnect lane in response to the at least one interconnect lane being unavailable.

2. The method of claim 1, further comprising:
   adjusting alignment marker insertion logic to map alignment markers to the second set of interconnect lanes.

3. The method of claim 1, wherein the interconnect lanes are Ethernet electrical lines or Ethernet optical lanes.

4. The method of claim 1, wherein the redistributing data to the second set of interconnect lanes enables a power saving mode.

5. The method of claim 1, wherein the redistributing data uses a symbol distribution unit in a physical coding sublayer to provide data to the second set in a round robin order.

6. The method of claim 1, wherein the determining that at least one interconnect lane is unavailable is performed by a fault detector using an input from an optical module.

7. The method of claim 1, wherein the determining that at least one interconnect lane is unavailable is performed by a fault detector receiving a power down command.

8. The method of claim 7, further comprising:
   determining that the at least one interconnect lane becomes available; and
   redistributing data to the first set of interconnect lanes.

9. The method of claim 8, further comprising:
   adjusting alignment marker insertion logic to map the alignment markers to the first set of interconnect lanes.

10. A network device, comprising:
    a media access sublayer; and
    a physical coding sublayer configured to:
    provide data across a first set of interconnect lanes;
    in response to receiving a power reduction message to enable power saving, determine that at least one interconnect lane among the first set of interconnect lanes is to be made unavailable; and
    redistribute data to a second set of interconnect lanes, the second set not including the at least one interconnect lane.

11. The network device of claim 10, wherein the network device is an Ethernet device.

12. The network device of claim 10, wherein the media access sublayer is paused while the physical coding sublayer is configured to redistribute data.

13. The network device of claim 10, wherein the first set of interconnect lanes comprises either eight optical interconnect lanes or four optical interconnect lanes.

14. The network device of claim 10, wherein the physical coding sublayer is configured to provide a message indicative of the second set of data interconnect lines to a receiving network device.

15. The network device of claim 10, wherein the physical coding sublayer is configured to adjust alignment marker insertion logic to map alignment markers to the second set of interconnect lanes.

16. The network device of claim 10, further comprising:
    a physical medium attachment (PMA) sublayer comprising components associated with the first set of interconnect lanes, wherein at least one component associated with the at least one interconnect lane is disabled in response to the at least one interconnect lane being unavailable.

17. The network device of claim 10, further comprising:
    a physical medium dependent (PMD) sublayer comprising transmitters associated with the first set of interconnect lanes, wherein at least one transmitter associated with the at least one interconnect lane is disabled in response to the at least one interconnect lane being unavailable.

18. A network device, comprising:
    one or more circuits configured to:
    provide data across a first set of interconnect lanes;
    in response to receiving a power reduction message to enable power saving, determine that at least one interconnect lane among the first set of interconnect lanes is to be made unavailable; and
    redistribute data to a second set of interconnect lanes, the second set not including the at least one interconnect lane.

19. The network device of claim 18, further comprising:
    a physical medium attachment (PMA) sublayer comprising components associated with the first set of interconnect lanes; and
    a physical medium dependent (PMD) sublayer associated with the first set of interconnect lanes.

20. The network device of claim 18, wherein the data is provided to a second network device via the first set of interconnect lanes, and wherein the power reduction message is received from the second network device.

* * * * *